(12) United States Patent
Bhattacharya et al.

(10) Patent No.: US 9,697,070 B2
(45) Date of Patent: Jul. 4, 2017

(54) PREDICTING SERVICE ISSUES BY DETECTING ANOMALIES IN EVENT SIGNAL

(71) Applicant: MICROSOFT TECHNOLOGY LICENSING, LLC, Redmond, WA (US)

(72) Inventors: Pamela Bhattacharya, Redmond, WA (US); Himesh Shah, Bothell, WA (US); Ganesh Pandey, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 101 days.

(21) Appl. No.: 14/840,518

(22) Filed: Aug. 31, 2015

(65) Prior Publication Data

US 2017/0060656 A1 Mar. 2, 2017

(51) Int. Cl.
*G06F 11/07* (2006.01)
*G06F 11/34* (2006.01)
*G06Q 10/06* (2012.01)

(52) U.S. Cl.
CPC ........ *G06F 11/079* (2013.01); *G06F 11/0709* (2013.01); *G06F 11/3466* (2013.01); *G06Q 10/063* (2013.01)

(58) Field of Classification Search
CPC .................. G06F 11/079; G06F 11/0709; G06F 11/3466
See application file for complete search history.

(56) References Cited

U.S. PATENT DOCUMENTS

| | | |
|---|---|---|
| 6,625,569 B2 | 9/2003 | James et al. |
| 6,993,458 B1 | 1/2006 | Castelli et al. |
| 7,310,590 B1 | 12/2007 | Bansal |
| 7,349,746 B2 | 3/2008 | Emigholz et al. |
| 7,437,308 B2 | 10/2008 | Kumar et al. |

(Continued)

FOREIGN PATENT DOCUMENTS

WO 2015001544 A2 1/2015

OTHER PUBLICATIONS

Chen, et al., "Event Detection using Customer Care Calls", In Proceedings of the IEEE INFOCOM, Apr. 14, 2013, 9 pages.

(Continued)

*Primary Examiner* — Yolanda L Wilson
(74) *Attorney, Agent, or Firm* — Turk IP Law, LLC

(57) ABSTRACT

Service issues predicted by detecting anomalies in an event signal is provided. An application such as a signal analysis application receives an event signal for analysis. The event signal includes events captured during a time period. The event signal is processed to generate a trend line. The trend line includes a best fit line transposed across averages of number of events of each data point across the time period. The number of events of an end data point may be compared to an upper confidence score and a lower confidence score associated with the end data point on the trend line. In response to detecting the number of events of the end data point exceed the upper confidence score, a notification is transmitted to a stakeholder associated with the event signal. The notification may describe a symptom associated with the number of events on the end data point.

20 Claims, 7 Drawing Sheets

(56) References Cited

U.S. PATENT DOCUMENTS

| | | | | |
|---|---|---|---|---|
| 8,069,370 | B1* | 11/2011 | Li | G06F 11/0709 |
| | | | | 714/26 |
| 8,306,931 | B1 | 11/2012 | Bowman et al. | |
| 8,306,943 | B2 | 11/2012 | Yepremyan et al. | |
| 8,661,299 | B1* | 2/2014 | Ip | H04L 43/0852 |
| | | | | 702/185 |
| 8,806,313 | B1 | 8/2014 | Yu et al. | |
| 8,972,332 | B2 | 3/2015 | Ruhl et al. | |
| 2002/0103624 | A1* | 8/2002 | Turicchi, Jr. | G06F 11/3409 |
| | | | | 702/186 |
| 2005/0216793 | A1* | 9/2005 | Entin | G06F 11/0709 |
| | | | | 714/38.1 |
| 2006/0153090 | A1 | 7/2006 | Bishop et al. | |
| 2008/0148180 | A1* | 6/2008 | Liu | G06F 11/3409 |
| | | | | 715/800 |
| 2012/0005533 | A1* | 1/2012 | Li | G06F 11/008 |
| | | | | 714/26 |
| 2012/0185735 | A1* | 7/2012 | Sambamurthy | G06F 11/079 |
| | | | | 714/47.1 |
| 2013/0304897 | A1 | 11/2013 | Suri et al. | |
| 2016/0062820 | A1* | 3/2016 | Jones | G06K 9/6265 |
| | | | | 714/37 |

OTHER PUBLICATIONS

Moayedi, et al., "Arima Model for Network Traffic Prediction and Anomaly Detection", In Proceedings of International Symposium on Information Technology, vol. 4, Aug. 26, 2008, 6 pages.

Oliveira, et al., "Detecting Novelties in Time Series Through Neural Networks Forecasting With Robust Confidence Intervals", In Proceedings of Neurocomputing, vol. 70, Issue 1-3, Dec. 2006, 3 pages.

Veasey, et al., "Anomaly Detection in Application Performance Monitoring Data", In International Journal of Machine Learning and Computing, vol. 4, No. 2, Apr. 2014, 7 pages.

"International Search Report and Written Opinion Issued in PCT Application No. PCT/US2016/049336", Mailed Date: Oct. 14, 2016, 11 Pages.

* cited by examiner

PREDICTING SERVICE ISSUES BY DETECTING ANOMALIES IN EVENT SIGNAL

BACKGROUND

In the modern world, people continue to increase their interactivity with computer systems. Development of faster and smaller electronics for computing devices has significantly increased use scenarios in which interactions occur between people and applications executed on the computing device. The high number of use scenarios leads to high risk of failures or misuse. Excessive number of failures and misuse correlate with large number of customer support events that consume resources of an organization providing services associated with the computing device or the applications. Data about support environments is seldom used to predict issues associated with devices, applications, or end users. A significant demand exists to automate analysis and management of events generated by systems such as a customer support system.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to a prediction of service issues by detecting anomalies in an event signal. In some examples, a signal analysis application may receive an event signal. The event signal may include events captured during a time period by an event provider such as a customer support provider. The event signal may be processed to generate a trend line. A number of events of an end data point of the event signal may be compared to an upper confidence score and a lower confidence score associated with the end data point of the trend line. A notification that describes a symptom associated with the end data point of the event signal may be transmitted in response to detecting the number of the events exceed the upper confidence score.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
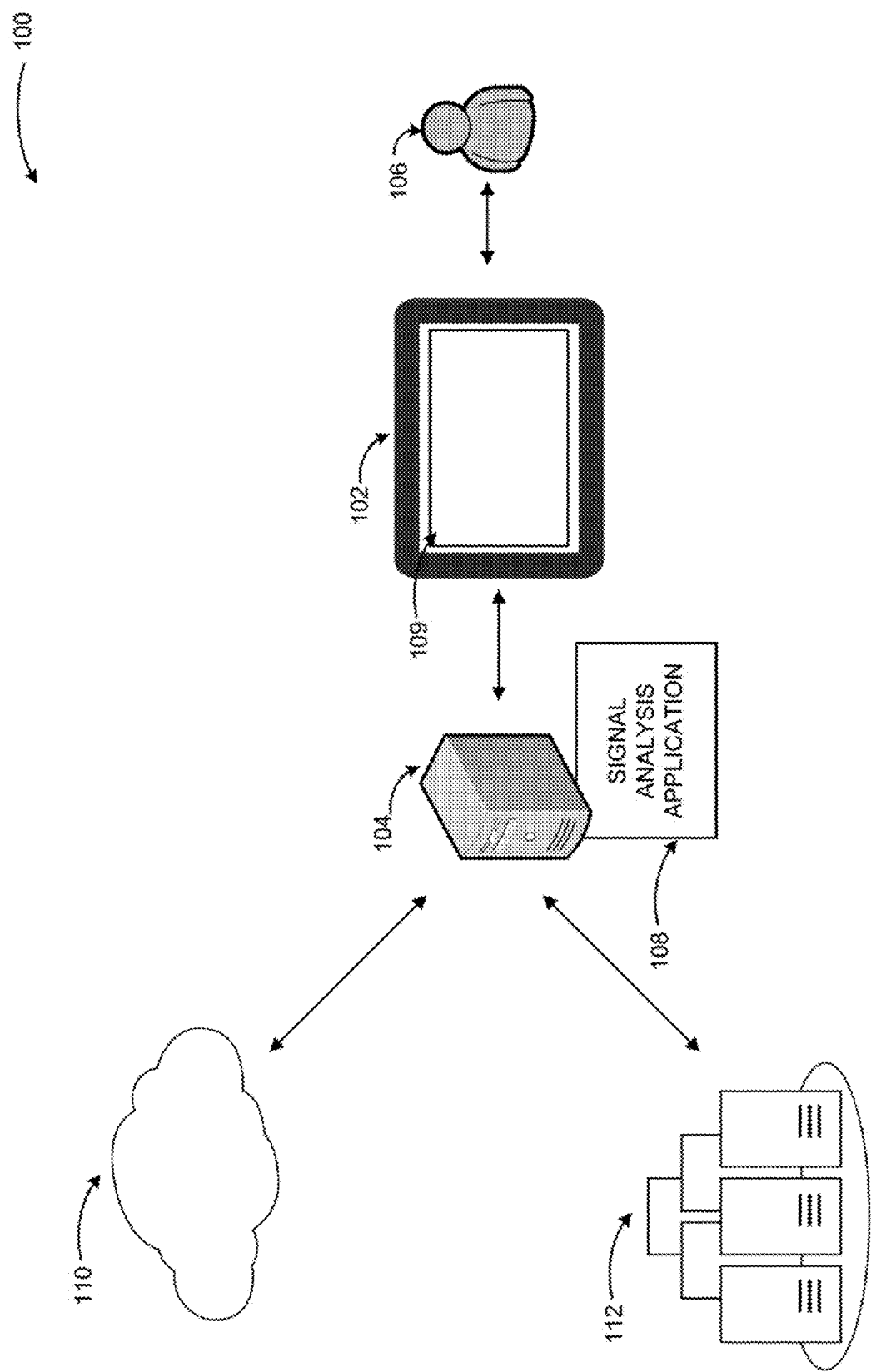
FIG. 1 is a conceptual diagram illustrating an example of predicting service issues by detecting anomalies in an event signal, according to embodiments.

As briefly described above, service issues may be predicted by detecting anomalies in an event signal by a signal analysis application. The signal analysis application may receive an event signal from a signal provider such as a customer support provider, and/or a data center, among others. The event signal may include events captured during a time period when the events were monitored. The event signal may be processed to generate a trend line, which may include a plot of averages of the events at each data point of the event signal, connected with a best fit line.

The number of events of a data point within the event signal may be compared to an upper confidence score and a lower confidence score associated with the end data point within the trend line. The end data point may include a present section of the time period or a recent section of the time period. The upper confidence score and the lower confidence scores may be values computed for the end data point based on a variance measurement between the number of the events that exceed or fall below the trend line for the preceding data points.

A notification that describes a symptom associated with the end data point within the event signal may be transmitted in response to detecting the number of the events on the end data point exceed the upper confidence score. The symptom may indicate a causality associated with a change applied to a system (associated with the event signal) and the number of events on the end data point within the event signal.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to predict service issues by detecting anomalies in an event signal. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least a memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs in conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

FIG. 1 is a conceptual diagram illustrating an example of predicting service issues by detecting anomalies in an event signal, according to embodiments.

In a diagram 100, a physical server 104 may execute a signal analysis application 108. The physical server 104 may include a standalone hardware server, a cluster of hardware servers, and/or a data center, among others. The physical server 104 may communicate with a client device 102 that provides a client application 109. The client application 109 may serve as a user interface between a user 106 (also known as a stakeholder) and the signal analysis application 108. The client device 102 may include a tablet device, a laptop computer, a desktop computer, and a smart phone, among others.

In an example scenario, a member of a support team (such as the user 106) may interact with the signal analysis application 108 through a user interface such as the client application 109. The member of the support team may execute actions through the client application 109 to analyze events associated with support activities, status of hardware components of a system, and/or status of performance of a system, among others.

The user 106 may be allowed to interact with the client application 109 through an input device or touch enabled display component of the client device 102. The client device 102 may include a display device such as the touch enabled display component, and a monitor, among others to provide the client application 109 to the user 106.

The physical server 104 may interact with event providers such as a cloud service 110 and/or a datacenter 112, among others to process event signals. An event signal may include a number of events captures across a time period. The event signals may include a variety of events such as support service related events, and/or performance related events, among others. The signal analysis application 108 may process a received event signal to generate a trend line. The trend line may include a best fit line of an average of a number events across each data point recorded by the event signal. Examples of a data point may include an hour, a day, a week, a month, and/or a year, among others.

The number of events of an end data point recorded within the event signal may be compared to an upper confidence score and a lower confidence score of the end data point within the trend line. The end data point may include a last data point such as a last day recorded by the event signal. The upper confidence score and the lower confidence score may provide a variance value between the number of the events that exceed the trend line and the number of the events that fall below the events during preceding data points. If the number of events are detected to exceed the upper confidence score, a notification may be transmitted to the user 106 (through the client application 109) to inform the user 106 of a symptom associated with the end data point within the event signal.

The user 106 may interact with the client application 109 with a keyboard based input, a mouse based input, a voice based input, a pen based input, and a gesture based input, among others. The gesture based input may include one or more touch based actions such as a touch action, a swipe action, and a combination of each, among others.

The signal analysis application 108 may store data associated with an event signal, locally. Alternatively, data associated with an event signal may be retrieved from a data service hosted by another physical server. The physical server 104 may communicate with the cloud service 110, the data center 112, and/or the client device 102, among others, through a network. The network may provide wired or wireless communications between nodes such as the physical server 104, or the client device 102, among others.

While the example system in FIG. 1 has been described with specific components including the physical server 104, the signal analysis application 108, embodiments are not limited to these components or system configurations and can be implemented with other system configuration employing fewer or additional components.

Figure 2:
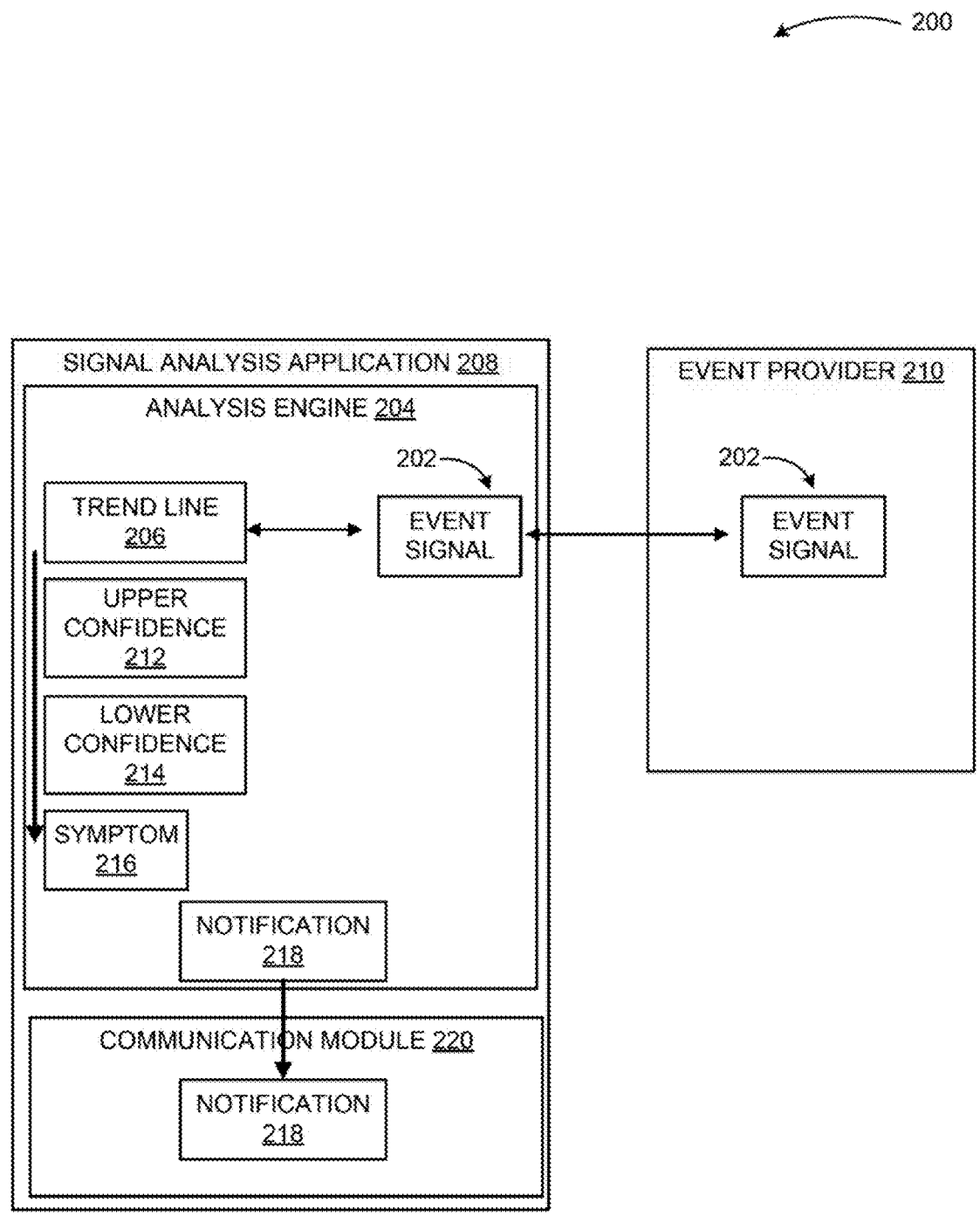
FIG. 2 is a display diagram illustrating an example of a signal analysis application that predicts service issues by detecting anomalies in an event signal, according to embodiments.

FIG. 2 is a display diagram illustrating an example of a signal analysis application that predicts service issues by detecting anomalies in an event signal, according to embodiments.

In a diagram 200, an event provider 210 may generate an event signal 202. Examples of the event provider 210 may include a customer support provider, components of a hardware such as a physical server, and/or a data center, among others. The event signal 202 may include support activity events, hardware component status events, and/or performance status events, among others. The event provider 210 may transmit the event signal 202 to a signal analysis application 208 periodically, or continuously for analysis.

The signal analysis application 208 may receive the event signal 202. Alternatively, the signal analysis application 208 may subscribe to the event provider 210 to retrieve the event signal 202 from the event provider 210 periodically or continuously. The event signal 202 may be analyzed to generate a trend line 206. An example of trend line 206 may include a best fit line transposed upon averages of number of events in each data point captured within the event signal 202. An example of the trend line 206 may include a straight line, a curved line, multiple connected lines (between data points such as days), among others.

An upper confidence score 212 and a lower confidence score 214 may be computed for each data point on the trend line. The data points on the trend line may reflect the data points of the event signal which include hours, days, weeks, months, and/or years, among others. The upper confidence score 212 may reflect a variance value between the data points that exceed the trend line for the data points preceding a selected data point for analysis. The lower confidence score 214 may reflect a variance value between the data points that fall below the trend line for the data points preceding a selected data point for analysis.

By default, an end data point of the event signal 202 may be analyzed to identify a symptom 216 associated with the end data point. An example of the end data point may include a number events captured on a present day within the event signal 202. In response to detecting the number of the events at the end data point exceed the upper confidence value of the end data point (variance from the trend line), a notification 218 may be generated that describes a symptom with the event signal 202 at the end data point.

In an example scenario, an update applied to a customer system may cause a number of service ticket events to be generated by customers. The number of service ticket events at a present day of the event signal 202 may exceed an upper confidence value 212 associated with the present day reflected on the trend line. The number of service ticket events that exceed the upper confidence value may indicate an issue with the update, which may necessitate servicing the customer system to apply repairs to alleviate incoming customer service ticket events.

The symptom 216 may include a correlation between the number of events on an end data point of the event signal 202 and changes applied to components of a system associated with the event signal 202. The event signal 202 may also capture measurements associated with the components of the system such as performance events, error events, and/or service events, among others.

The correlation may be included in the notification 218 that is generated to inform a stakeholder about the number of events that exceed the upper confidence score 212. A communication module 220 of the signal analysis application 208 may transmit the notification 218 to the stakeholder (such as a support team assigned to support the event signal 202) to inform the stakeholder to take an action to resolve the symptom 216.

Figure 3:
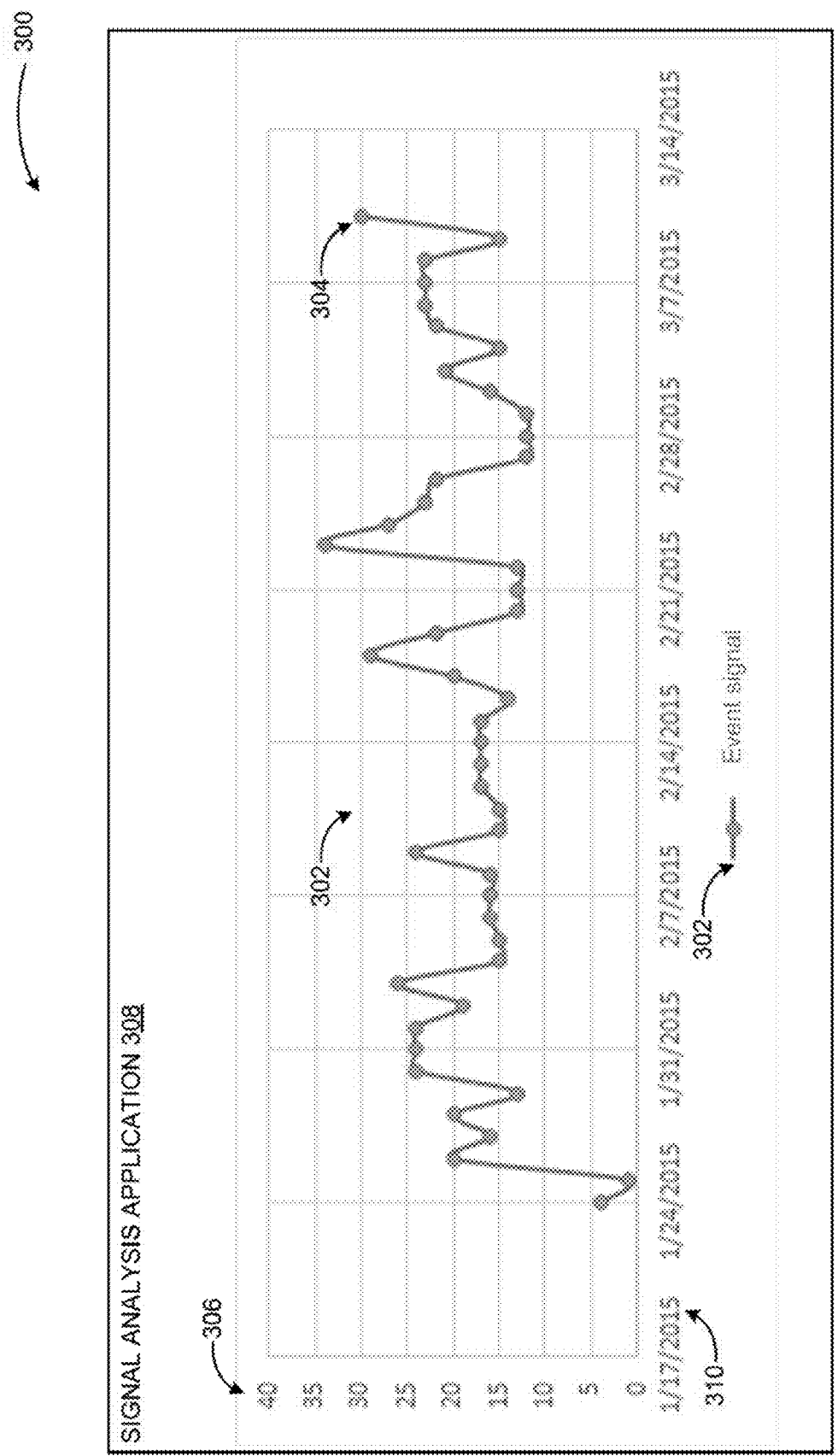
FIG. 3 is a display diagram illustrating an example of an event signal which may be used to predict service issues by detecting anomalies, according to embodiments.

FIG. 3 is a display diagram illustrating an example of an event signal, which may be used to predict service issues by detecting anomalies, according to embodiments.

In a diagram 300, a signal analysis application 308 may analyze an event signal 302 received from an event provider. The event signal 302 may be represented as a plot of multiple data points 310. Each data point may reflect a number 306 of the events. An example of a data point may include number of events measured within an hour, a day, a week, a month, and/or a year, among other time units.

The event signal 302 may include multiple data points captured across a time period. In an example scenario, number of events generated within a day may be captured across a number of days (such as 1 month, and/or 2 weeks, among others). An end data point 304 such as a present day may be analyzed to identify a symptom with the number of events recorded on the end data point 304.

The data points 310 may also be updated with new number of events that are captured with a progress of time. The event signal 302 may be re-processed with each update that may include new data points. For example, the number of events may be continually added to maintain a synchronization between the end data point 304 and real time. As such, the event signal 302 may reflect a current status of events captured at a monitored system.

Figure 4:
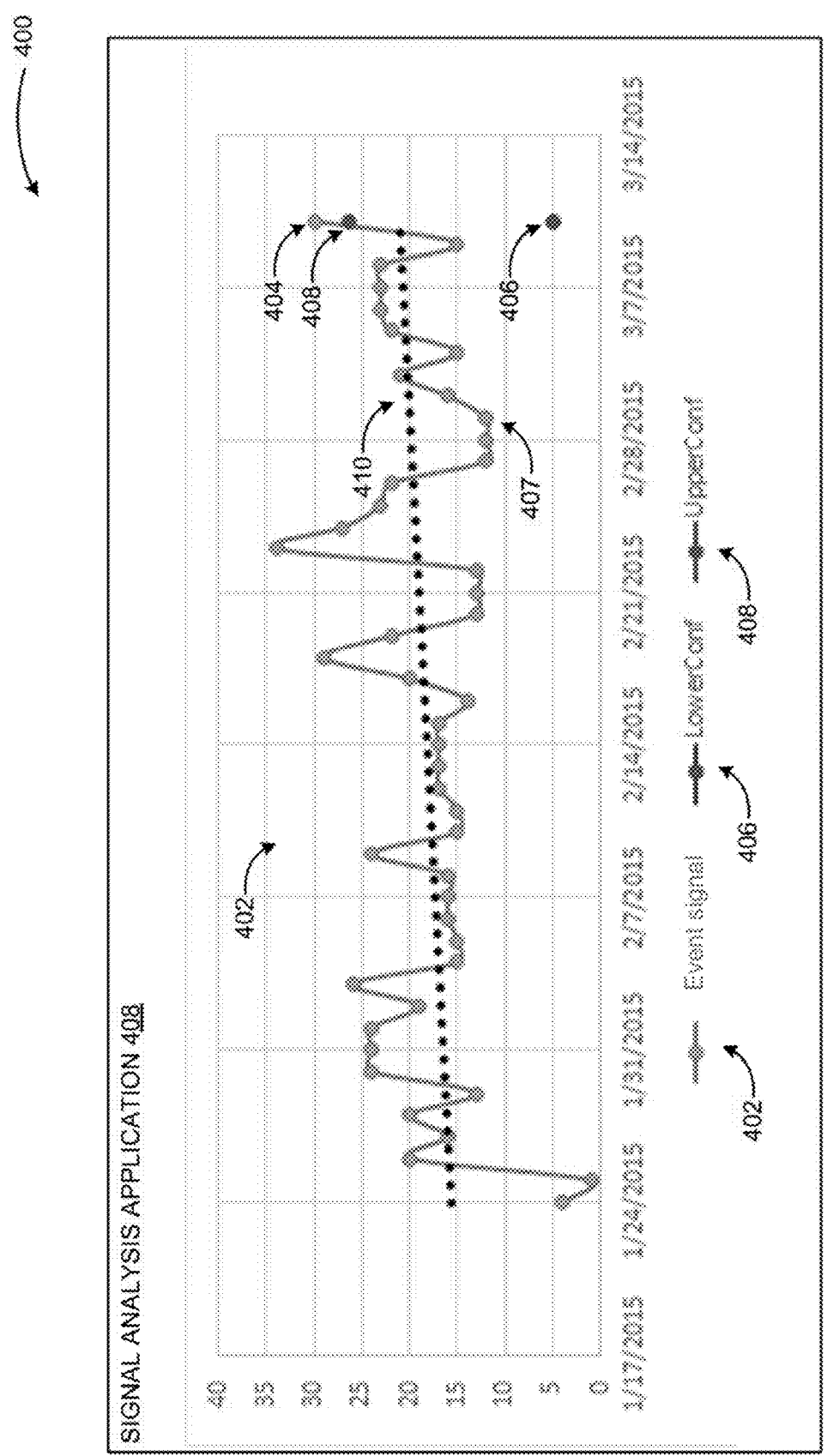
FIG. 4 is a display diagram illustrating an example of predicting service issues by detecting anomalies in an event signal, according to embodiments.

FIG. 4 is a display diagram illustrating an example of predicting service issues by detecting anomalies in an event signal, according to embodiments.

In a diagram 400, a signal analysis application may process an event signal 402. The event signal 402 may include data points captured across a period of time. An example of a data point may include a number of events recorded in a day. A trend line 410 may be computed for the event signal 402 by transposing a best fit line across an average of the number of events across each data point within the event signal 402.

In an example scenario, a first data point with a value of 10 (as the number of events at the first data point), a second data point with a value of 20 (as the number of events at the second data point), and a third data point with a value of 15 (as the number of events at the third data point) may be analyzed to generate the trend line 410. The average of the first data point, the second data point, and the third data point may be a value of that increases from a value of 12.5 at the first end to a value of 17.5 at the last end data point. As such, a trend line 410 may be plotted to go through a value of 12.5 through a value of 17.5 across the first, second, and third data points (not pictured).

An upper confidence score 408 and a lower confidence score 406 may be computed for each data point on the trend line to identify a symptom with the number of events on the data point. In an example scenario, an end data point 404 may be analyzed to detect a symptom with the number of events on the end data point 404. The end data point 404 may include a present time unit (such as a present hour, and/or a present day, among others). The number of events of the end data point 404 may be compared to the upper confidence score 408. If the number of the events of the end data point 404 exceed the upper confidence score 408 then a notification of a symptom may be generated and transmitted to a stakeholder of the event signal 402. The stakeholder may include a support team member assigned to monitor the event signal 402.

The symptom may identify a correlation with the number of events of the end data point 404 and an update applied to components of a system measured with the event signal 402. If a timing of the update may be within a proximity to the end data point 404 then the correlation may link the update and the increased number of events on the end data point 404 and prompt the stakeholder to resolve the issue associated with the update.

In another example scenario, another data point 407 may be compared to another lower confidence score associated with the other data point. If the number of events of the other data point falls below the other lower confidence score then a notification of a success associated with a previous update may be transmitted to a stakeholder associated with the event signal 402. The notification may correlate the previous update of components of a system with the lower number of events of the other data point (which may indicate resolution of previous issues captured by the event signal 402).

In yet another example scenario, instructions to analyze a selected data point 407 may be received. The selected data point 407 may be compared to associated upper and lower confidence scores. The results may be transmitted in a notification to a stakeholder of the event signal 402 to prompt the stakeholder to act to resolve a symptom or review successful results associated with an update applied to components of a system measured by the event signal 402.

The event signal 402 may capture measurements of a geographic distribution of components of a system. An example may include physical servers hosting data in a geopolitical region. The event signal 402 may also capture measurements associated with components of a data store that provide access files hosted by the data store. Additionally, the event signal 402 may also capture measurements of components of a data center.

The event signal 402 may also capture interactions with a user interface as the number of events. The interactions may indicate symptoms (or issues) with components of a user interface where the number of interactions where a number of interactions exceed an upper confidence score associated with an analyzed data point.

As discussed above, the application may be employed to perform operations associated with predicting service issues by detecting anomalies in an event signal. An increased user efficiency with the signal analysis application 108 may occur as a result of notifying stakeholder of symptoms associated with number of events recorded in a time period analyzed based on historical data points. Additionally, streamlined analysis of number of events across a time period by a signal analysis application 108 may reduce processor load, increase processing speed, conserve memory, and reduce network bandwidth usage.

Embodiments, as described herein, address a need that arises from a lack of efficiency between a stakeholder interacting with the signal analysis application 108 of the physical server 104. The actions/operations described herein are not a mere use of a computer, but address results that are a direct consequence of software used as a service offered to large numbers of users and applications.

The example scenarios and schemas in FIG. 1 through 4 are shown with specific components, data types, and configurations. Embodiments are not limited to systems according to these example configurations. Predicting service issues by detecting anomalies in an event signal may be implemented in configurations employing fewer or additional components in applications and user interfaces. Furthermore, the example schema and components shown in FIG. 1 through 4 and their subcomponents may be implemented in a similar manner with other values using the principles described herein.

Figure 5:
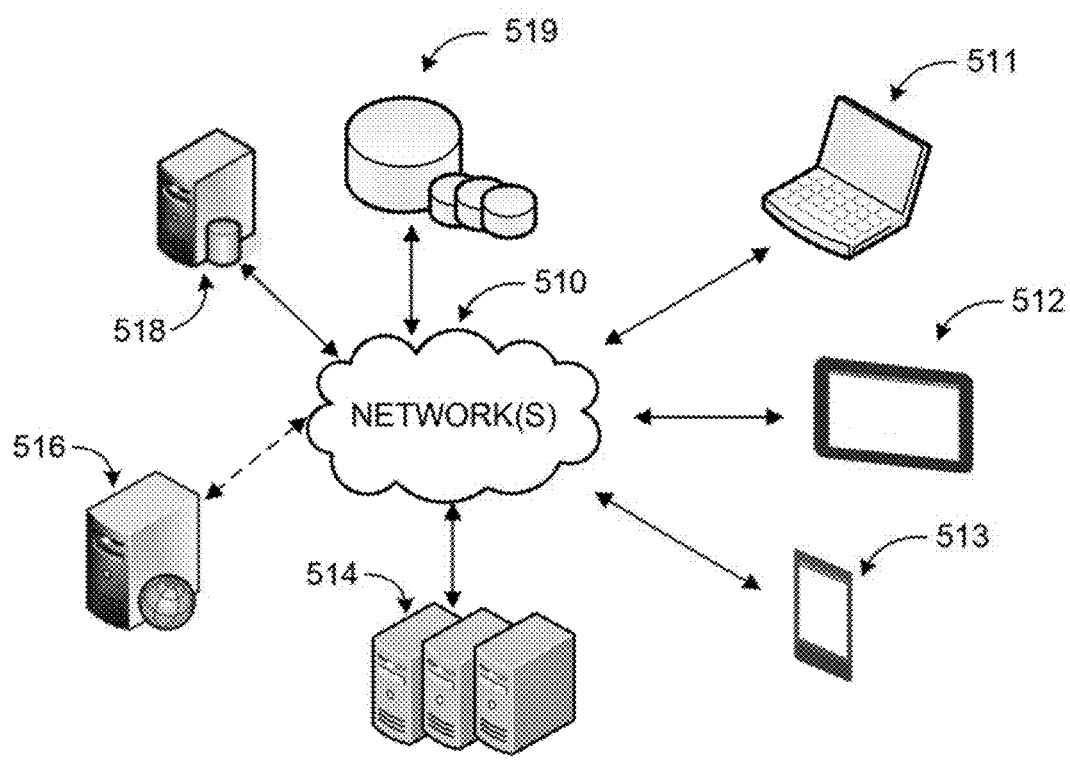
FIG. 5 is a simplified networked environment, where a system according to embodiments may be implemented.

FIG. 5 is an example networked environment, where embodiments may be implemented. A signal analysis application configured to predict service issues by detecting anomalies in an event signal may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A signal analysis application may process a received event signal to generate a trend line. A number of events of an end data point of the event signal may be compared to an upper confidence score and a lower confidence score associated with the end data point within the trend line. In response to detecting the number of the events exceed the upper confidence score, a notification may be transmitted. The notification may describe a symptom associated with the end data point within the event signal. The signal analysis application may store data associated with the event signal in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to predict service issues by detecting anomalies in an event signal. Furthermore, the networked environments discussed in FIG. 5 are for illustration purposes only. Embodiments are not limited to the example applications, modules, or processes.

Figure 6:
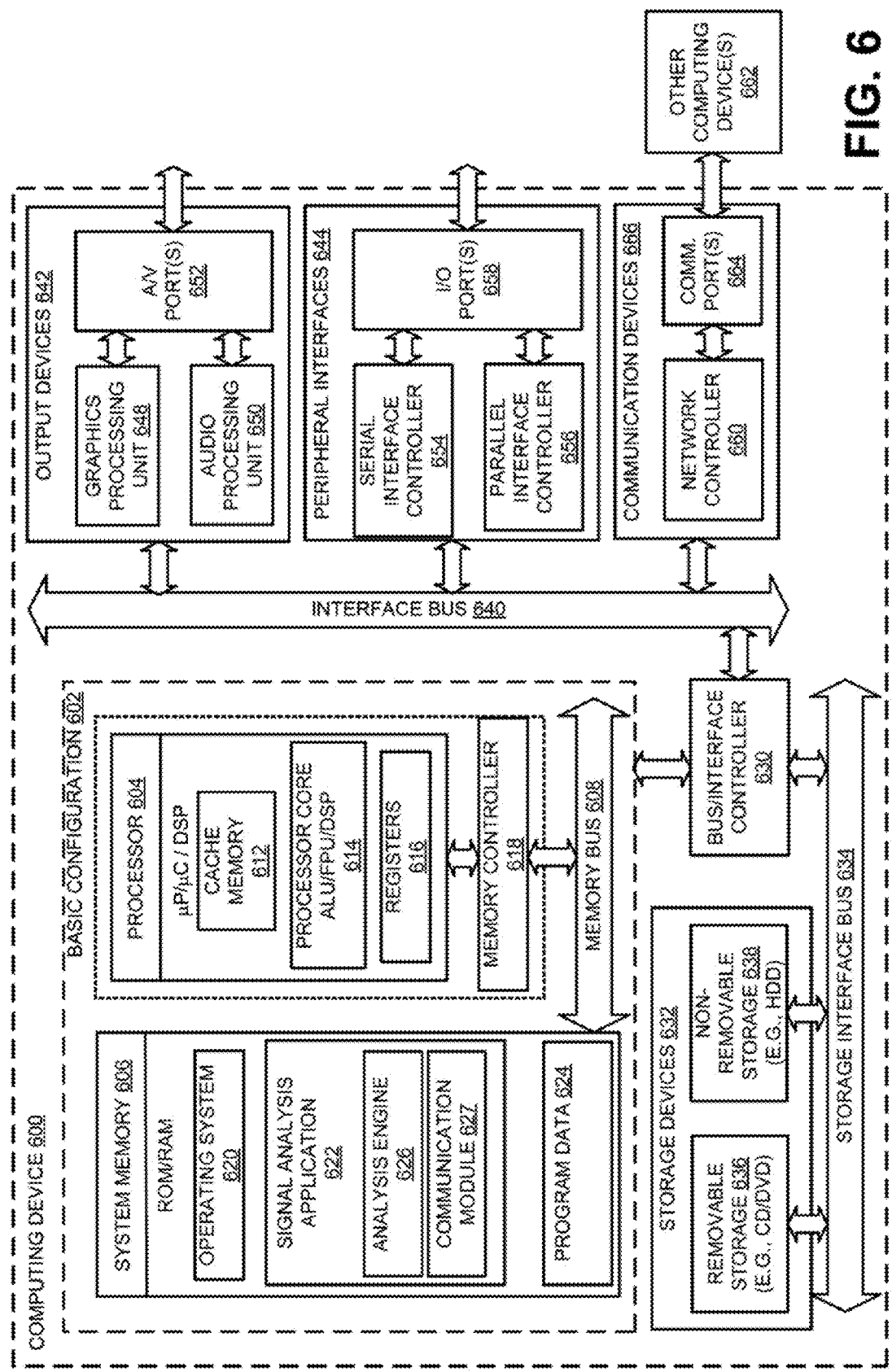
FIG. 6 is a block diagram of an example computing device, which may be used to predict service issues by detecting anomalies in an event signal.

FIG. 6 is a block diagram of an example computing device, which may be used to predict service issues by detecting anomalies in an event signal.

For example, computing device 600 may be used as a physical server, desktop computer, portable computer, smart phone, special purpose computer, or similar device. In an example basic configuration 602, the computing device 600 may include one or more processors 604 and a system memory 606. A memory bus 608 may be used for communication between the processor 604 and the system memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each)

include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a signal analysis application 622, and a program data 624. The signal analysis application 622 may include components such as an analysis engine 626 and a communication module 627. The analysis engine 626 and the communication module 627 may execute the processes associated with the signal analysis application 622. The analysis engine 626 may process a received event signal to generate a trend line. A number of events of an end data point of the event signal may be compared to an upper confidence score and a lower confidence score associated with the end data point within the trend line. In response to detecting the number of the events exceed the upper confidence score, a notification may be transmitted by the communication module 627. The notification may describe a symptom associated with the end data point within the event signal The signal analysis application 622 may utilize a networking device of the computing device 600 to interact with other devices such an event provider. Furthermore, the program data 624 may include, among other data, event signal, or the like, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices may include magnetic disk devices, such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable, and non-removable media implemented in any method or technology for storage of information, such as computer-readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer, which includes any of the above functions. The computing device 600 may also be implemented as a personal computer including both laptop computer and non-laptop computer configurations.

Example embodiments may also include methods to predict service issues by detecting anomalies in an event signal. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
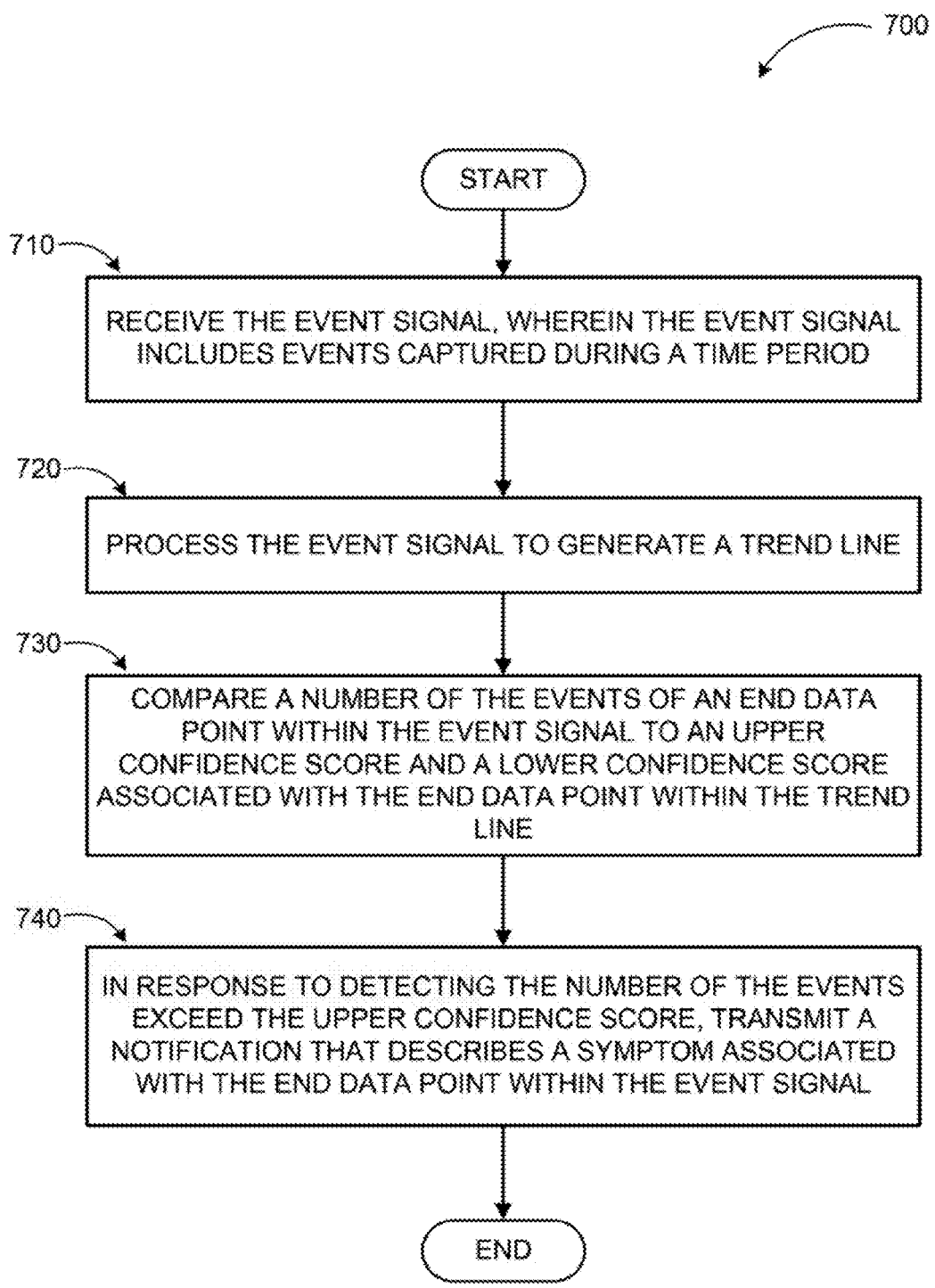
FIG. 7 is a logic flow diagram illustrating a process for predicting service issues by detecting anomalies in an event signal, according to embodiments.

FIG. 7 is a logic flow diagram illustrating a process for predicting service issues by detecting anomalies in an event signal, according to embodiments. Process 700 may be implemented on a computing device, such as the computing device 600 or another system.

Process 700 begins with operation 710, where an event signal may be received. The event signal may include events captured during a period of time. The event signal may include a number of events for each section of the period of time (also known as a data point) such as a day. At operation 720, the event signal may be processed to generate a trend line. The trend line may include a best fit line transposed on averages of number of events across each data point on the event signal.

At operation 730, a number of the events on an end data point within the event signal may be compared to an upper confidence score and a lower confidence score associated with the end data point within the trend line. The upper and lower confidence scores may correspond to variance values between number of events that exceed and fall below the trend line in preceding data point across the event signal, respectively. At operation 740, in response detecting the number of the events exceed the upper confidence score, a notification may be transmitted that describes a symptom associated with the end data point within the event signal.

The operations included in process 700) are for illustration purposes. Predicting service issues by detecting anomalies in an event signal may be implemented by similar processes with fewer or additional steps, as well as in different order of operations using the principles described herein.

According to some examples, a computing device for predicting service issues by detecting anomalies in an event signal may be described. The computing device includes a networking device, a memory configured to store instructions associated with a signal analysis application, one or more processors coupled to the memory and the communication device. The one or more processors executes a signal analysis in conjunction with the instructions stored in the memory. The signal analysis application includes an analysis engine and a communication module. The analysis engine is configured to receive, through the networking device, the event signal, where the event signal includes events captured during a time period, process the event signal to generate a trend line, and compare a number of the events of an end data point within the event signal to an upper confidence score and a lower confidence score associated with the end data point within the trend line. The communication module is configured to in response to detecting the number of the events exceed the upper confidence score, transmit, through the networking device, a notification that describes a symptom associated with the end data point within the event signal.

According to other examples, the events may include one or more of: support activity events, hardware component status events, and performance status events. The analysis engine is further configured to query a personnel provider to identify a support team assigned to monitor the event signal or identify the support team assigned to monitor the event signal from the event signal, and provide the notification to the communication module to prompt the communication module to transmit the notification to the support team.

According to further examples the analysis engine is further configured to compute averages for the number of the events in each data point within the event signal and transpose a best fit line over the averages to generate the trend line. The end data point identifies a periodic section of the time period in which the event signal is captured, where the end data point includes one or more of: a present time period within the event signal and a recent time period within the event signal.

According to other examples, the analysis engine is further configured to query one or more components of a system associated with the event signal to identify one or more changes associated with the one or more components, where the event signal includes measurements associated with the one or more components and identify a relationship between a timing of the one or more changes and the number of the events of the end data point of the event signal. The relationship includes a causal time period between the timing of the one or more changes and the number of the events of the end data point of the event signal. The analysis engine is further configured to describe a correlation between the timing of the one or more changes and the number of the events of the end data point of the event signal within the notification, where the correlation is based on the relationship.

According to further examples, the analysis engine is further configured to receive instructions to analyze a selected data point within the event signal, compare a number of the events of the selected data point within the event signal against another upper confidence score and another lower confidence score associated with the selected data point within the trend line, in response to detecting the number of the events exceed the other upper confidence score, prompt the communication module to transmit another notification that describes another symptom associated with the selected data point within the event signal, query one or more components of a system associated with the event signal to identify one or more resolutions associated with the symptom applied to the one or more components, generate a historical report that includes the other notification and a description of the one or more resolutions applied to the one or more components, and provide the historical report to the communication module to prompt the communication module to transmit the historical report.

According to other examples, the analysis engine is further configured to in response to a detection of the number of the events fall below the lower confidence score, query one or more components of a system associated with the event signal to identify one or more changes applied to the one or more components within a timing that is in proximity to the end data point within the event signal, where the event signal includes measurements associated with the one or more components, and provide another notification to the communication module to prompt the communication module to transmit the other notification, where the other notification describes a success associated with the one or more changes.

According to some examples, a method executed on a computing device for predicting service issues by detecting anomalies in an event signal may be described, The method may include receiving the event signal, where the event signal includes events captured during a time period, where the time period includes one or more of: hours, days, weeks, and months, processing the event signal to generate a trend line, comparing a number of the events on an end data point within the event signal to an upper confidence score and a lower confidence score associated with the end data point within the trend line, and in response to detecting the number of the events exceed the upper confidence score, transmitting a notification that describes a symptom associated with the event signal on the end data point.

According to further examples, the method may further include receiving an update to the event signal, where the update includes new events captured during a new time period, applying the update to the event signal, updating the trend line with the number of new events, comparing the number of the events of the end data point within the updated event signal against another upper confidence score and another lower confidence score associated with the end data point of the updated trend line, and in response to detecting the number of the events exceed the other upper confidence score, transmitting another notification that describes another symptom associated with the updated event signal on the end data point.

According to other examples, the method may further include computing the upper confidence score based on a variance between the trend line and a value of the number of the events for each data point of the event signal that is above the trend line. The method may further include computing the lower confidence score based on a variance between the trend line and a value of the number of the events for each data point of the event signal that is below the trend line. The event signal includes measurements of one or more of: a geographic distribution of one or more components of a system, one or more components associated with an availability of a data store, and one or more components of a data center.

According to some examples, a computer-readable memory device with instructions stored thereon for predicting service issues by detecting anomalies in an event signal. The instructions may include actions that are similar to the method described above.

According to some examples, a means to predict service issues by detecting anomalies in an event signal may be described. The means to predicting service issues by detecting anomalies in an event signal may include a means to receive the event signal, where the event signal includes events captured during a time period, a means to process the event signal to generate a trend line, a means to, compare a number of the events of an end data point within the event signal to an upper confidence score and a lower confidence score associated with the end data point within the trend line, and a means to in response to detecting the number of the events exceed the upper confidence score, transmit a notification that describes a symptom associated with the end data point within the event signal.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A computing device for predicting service issues by detecting anomalies in an event signal, the computing device comprising:
 a networking device;
 a memory configured to store instructions associated with a signal analysis application;
 one or more processors coupled to the memory and the networking device, the one or more processors executing the signal analysis application in conjunction with the instructions stored in the memory, wherein the signal analysis application includes:
 an analysis engine configured to:
  receive, through the networking device, the event signal, wherein the event signal includes events captured during a time period;
  process the event signal to generate a trend line;
  compare a number of the events of an end data point within the event signal to an upper confidence score and a lower confidence score associated with the end data point within the trend line; and
 a communication module configured to:
  in response to detecting the number of the events exceed the upper confidence score, transmit, through the networking device, a notification that describes a symptom associated with the end data point within the event signal.

2. The computing device of claim 1, wherein the events include one or more of: support activity events, hardware component status events, and performance status events.

3. The computing device of claim 1, wherein the analysis engine is further configured to:
 one or more of:
  query a personnel provider to identify a support team assigned to monitor the event signal;
  identify the support team assigned to monitor the event signal from the event signal; and
 provide the notification to the communication module to prompt the communication module to transmit the notification to the support team.

4. The computing device of claim 1, wherein the analysis engine is further configured to:
 compute averages for the number of the events in each data point within the event signal; and
 transpose a best fit line over the averages to generate the trend line.

5. The computing device of claim 1, wherein the end data point identifies a periodic section of the time period in which the event signal is captured, wherein the end data point includes one or more of: a present time period within the event signal and a recent time period within the event signal.

6. The computing device of claim 1, wherein the analysis engine is further configured to:
 query one or more components of a system associated with the event signal to identify one or more changes associated with the one or more components, wherein the event signal includes measurements associated with the one or more components; and
 identify a relationship between a timing of the one or more changes and the number of the events of the end data point of the event signal.

7. The computing device of claim 6, wherein the relationship includes a causal time period between the timing of the one or more changes and the number of the events of the end data point of the event signal.

8. The computing device of claim 6, wherein the analysis engine is further configured to:
 describe a correlation between the timing of the one or more changes and the number of the events of the end data point of the event signal within the notification, wherein the correlation is based on the relationship.

9. The computing device of claim 1, wherein the analysis engine is further configured to:
 receive instructions to analyze a selected data point within the event signal;
 compare a number of the events of the selected data point within the event signal against another upper confidence score and another lower confidence score associated with the selected data point within the trend line; and
 in response to detecting the number of the events exceed the other upper confidence score, prompt the communication module to transmit another notification that describes another symptom associated with the selected data point within the event signal.

10. The computing device of claim 9, wherein the analysis engine is further configured to:
   query one or more components of a system associated with the event signal to identify one or more resolutions associated with the symptom applied to the one or more components;
   generate a historical report that includes the other notification and a description of the one or more resolutions applied to the one or more components; and
   provide the historical report to the communication module to prompt the communication module to transmit the historical report.

11. The computing device of claim 1, wherein the analysis engine is further configured to:
   in response to a detection of the number of the events fall below the lower confidence score,
      query one or more components of a system associated with the event signal to identify one or more changes applied to the one or more components within a timing that is in proximity to the end data point within the event signal, wherein the event signal includes measurements associated with the one or more components; and
      provide another notification to the communication module to prompt the communication module to transmit the other notification, wherein the other notification describes a success associated with the one or more changes.

12. A method executed on a computing device for predicting service issues by detecting anomalies in an event signal, the method comprising:
   receiving the event signal, wherein the event signal includes events captured during a time period, wherein the time period includes one or more of: hours, days, weeks, and months;
   processing the event signal to generate a trend line;
   comparing a number or the events on an end data point within the event signal to an upper confidence score and a lower confidence score associated with the end data point within the trend line; and
   in response to detecting the number of the events exceed the upper confidence score, transmitting a notification that describes a symptom associated with the event signal on the end data point.

13. The method of claim 12, further comprising:
   receiving an update to the event signal, wherein the update includes new events captured during a new time period;
   applying the update to the event signal; and
   updating the trend line with the number of new events.

14. The method of claim 13, further comprising:
   comparing the number of the events of the end data point within the updated event signal against another upper confidence score and another lower confidence score associated with the end data point of the updated trend line; and
   in response to detecting the number of the events exceed the other upper confidence score, transmitting another notification that describes another symptom associated with the updated event signal on the end data point.

15. The method of claim 12, further comprising:
   computing the upper confidence score based on a variance between the trend line and a value of the number of the events for each data point of the event signal that is above the trend line.

16. The method of claim 12, further comprising:
   computing the lower confidence score based on a variance between the trend line and a value of the number of the events for each data point of the event signal that is below the trend line.

17. The method of claim 12, wherein the event signal includes measurements of one or more of: a geographic distribution of one or more components of a system, one or more components associated with an availability of a data store, and one or more components of a data center.

18. A method for predicting service issues by detecting anomalies in an event signal, the method comprising:
   receiving the event signal, wherein the event signal includes events captured during a time period, wherein the time period includes one or more of: hours, days, weeks, and months;
   processing the event signal to generate a trend line;
   comparing a number of the events on an end data point within the event signal to an upper confidence score and a lower confidence score associated with the end data point within the trend line;
   in response to detecting the number of the events exceed the upper confidence score, transmitting a notification that describes a symptom associated with the event signal on the end data point, wherein the notification further describes a correlation between a timing of one or more changes associated with one or more components of a system and the number of the events of the end data point; and
   in response to detecting the timing of the one or more changes is within a proximity to the end data point, prompting a stakeholder to resolve the symptom as associated with the one or more changes.

19. The method of claim 18, wherein the method further comprise:
   querying the one or more components of the system associated with the event signal to identify the one or more changes associated with the one or more components, wherein the event signal includes measurements associated with the one or more components; and
   identifying a relationship between the timing of the one or more changes and the number of the events of the end data point of the event signal,
   wherein the correlation is based on the relationship.

20. The method of claim 18, wherein the method further comprise:
   receiving an update to the event signal, wherein the update includes new events captured during a new time period;
   applying the update to the event signal;
   updating the trend line with the number of new events;
   comparing the number of the events of the end data point within the updated event signal against another upper confidence score and another lower confidence score associated with the end data point of the updated trend line; and
   in response to detecting the number of the events exceed the other upper confidence score, transmitting another notification that describes another symptom associated with the updated event signal on the end data point.

* * * * *